July 6, 1965   H. FUHRMANN   3,193,355
METHOD FOR ANALYTICAL TESTING OF LIQUIDS
Filed April 25, 1961   2 Sheets-Sheet 1

INVENTOR:
HANS FUHRMANN
BY Howson & Howson
ATTYS.

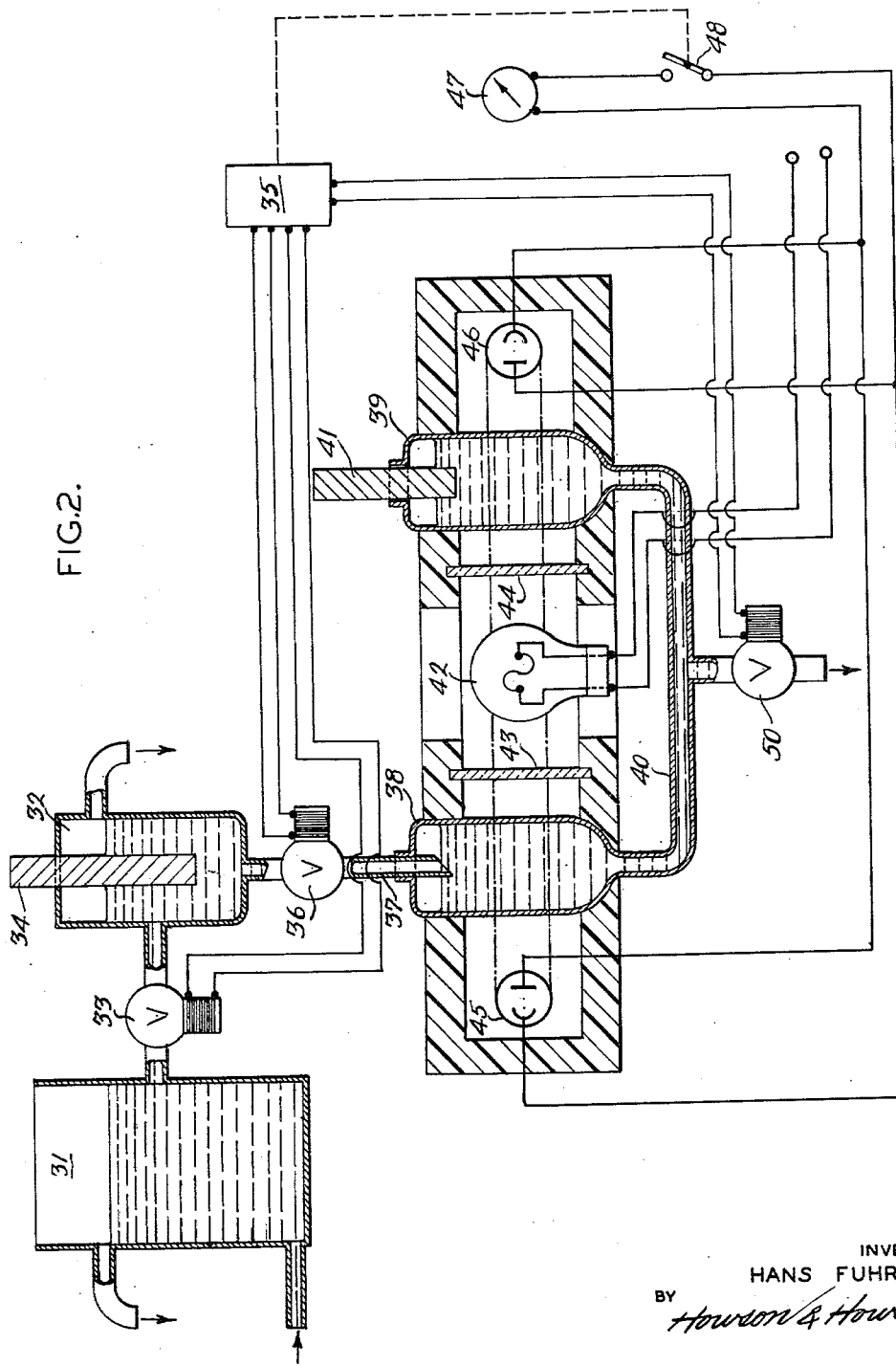

3,193,355
METHOD FOR ANALYTICAL TESTING OF LIQUIDS
Hans Fuhrmann, Hamburg, Germany, assignor to S.L.F. Engineering Company, Philadelphia, Pa., a partnership
Filed Apr. 25, 1961, Ser. No. 105,500
10 Claims. (Cl. 23—230)

This application is a continuation-in-part of my earlier filed pending application, Serial No. 550,453, filed Dec. 1, 1955, and now abandoned.

The present invention relates to analytical quantitative testing of liquids for the presence of a particular ion performed by taking samples, which then are tested by adding chemical reagents. The present invention depends upon comparative analysis by color of continuously or intermittently flowing samples wherein the color of the sample is compared before and after treatment. The invention also concerns apparatus for practicing the method.

A typical area in which the technique of the present invention is applicable is determination of hardness in water. The method for determining the hardness by means of a soap solution, which has been successfully used for a long time for testing boiler feed water, is no longer adequate in view of the greater accuracy required and in view of the high operating pressures of boilers which make old sampling techniques difficult. In place of the soap solution method the so-called "complex ion" method is now generally used which makes it possible to determine even smallest degrees of hardness of a liquid (i.e., presence of calcium and magnesium). The complex ion method as described by J. Carrell Morris in an article entitled, "The Schwarzenbach Method For Determination of Hardness," appearing in the New England Water Works Association Journal, vol. 65, 1951, pages 128 to 133, relies upon the ability of certain cations, such as hardness producing calcium and magnesium ions, to form stable complexes. Certain complex ion containing materials which are ion receptive and may be termed "complexing agents" are selected for their ability to provide ions to combine with ions of the liquid to be treated, e.g., cations of calcium and magnesium in hardness testing.

In general the complex ion method has been performed by titration. For example, by a usual technique the water sample to be tested first has an indicator added to it. In many cases a buffer is necessary to stabilize pH and prevent change of indicator color due to pH change. Thereafter as much of a complex ion solution or reagent is added by titration as is necessary to cause a change of color, through the complete range of the indicator, as, for example, from red to blue, where red and blue are terminal colors. The quantity of complex ion solution added is a measure of the hardness of the water and permits an exact calculation thereof. This method is dependent upon a change in color through the complete range, i.e., from a terminal wine red through violet to a terminal pale blue for Chromogenschwarz in hardness testing. Sufficient complex ion reagent to effect this change is employed, regardless of its total amount. Hardness can then be ascertained by exact measurement of the volume of material titrated into a fixed volume of sample to be tested in order to bring about this complete color change.

This method, although quite accurate, has numerous disadvantages. Perhaps the greatest of these is the need for employing laboratory techniques. Titration or dosing has to proceed and be carefully controlled and observed until it reaches the end point so that the calculation can be made.

Another method for determining the residual hardness by means of a complexing agent is also known. By this method constant amounts of indicator, buffer solution, and complexing agent are also added at one time to a sample of fixed volume to be analyzed, and the shade of color, which depends on the degree of hardness of the water to be tested, is measured colorimetrically. By this method, for example, after the addition of all the materials required if Chromogenschwarz is employed, the color of the solution will be pure blue provided that the water is completely free from hardness. If its hardness is less than a predetermined amount which produces a terminal wine red color, it will have a distinctive shade of violet which is indicative of a unique hardness. Once it reaches wine red, however, it is clear that its hardness exceeds the predetermined amount. For the colorimetric determination of the color intensity the dosage of the indicator, which is a dye stuff and, therefore, colors the liquid, is of decisive importance. The shade and the intensity of color of the solution dyed by the indicator, therefore, depends both on the quantity of indicator employed and on the residual hardness of the water sample assuming that all other factors affecting color, such as pH are controlled. Thus, for different dosages of dye indicator, water of a particular hardness shows different color values, which correspond to the color values of a particular dosage of dye indicator with water of different hardness. Consequently, this method requires dosing with the dye has to be done with very great accuracy so that the same general disadvantages inherent in the above-described type of a complex ion method are also present here.

The present invention by contrast is suitable for installation under almost any conditions of use. Highly precise laboratory type measurements are unnecessary and yet a degree of accuracy quite compatible with that achieved by such measurements in the prior art is possible. Moreover, the present invention makes possible a substantially constant monitoring of a liquid to be sure that its ion content remains within predetermined tolerances whereas prior art techniques lent themselves at best to frequent spot checks. Furthermore, the apparatus of the present invention lends itself to automatic or semi-automatic operation which was impossible by methods disclosed in the prior art.

The present invention provides a method for analytical testing of liquids by a complexing agent, color measuring technique. Broadly, the invention comprises adding at least a dye indicator in constantly dosed amounts to a liquid to be tested prior to a first color measuring step. Part of the liquid is further treated prior to a second color measuring step by adding the necessary further components in constantly dosed amounts. This is done in such a way that the first and second color measuring steps may be simultaneously accomplished and the two colors compared so that their difference in color may be ascertained.

There are two convenient means of accomplishing this method. One means is to allow the ion containing liquid to be tested to continuously flow past successive dosage stations each followed closely by color measuring stations. If the liquid flow is sufficiently fast with respect to the change in ion content, parts of the liquid at the respective color measuring stations may be regarded the same except for additions at the intermediate dosage stations and hence afford proper comparison. Another means is to separate a batch of liquid of selected size, subject all of the sample first to the first treatment but only part of the sample to the second treatment. By properly controlling the dosages highly accurate results may be obtained.

Preferably the method is performed in such a manner that in the first treatment step the indicator alone is added to the liquid to be tested, and in the second treatment step a mixture of buffer and complexing agent is added, after which the difference between the shades of color obtained in the first and second measuring step is colorimetrically measured and compared.

Accordingly to a further embodiment of the invention the indicator as well as constant amounts of buffers and complexing agent are added in a first measuring step to the liquid to be tested. Thereafter, in a second measuring step the liquid is further treated by adding either an excess of complex ion, for attaining one of the terminal color values of the measuring range, or pure magnesium, or calcium in the form of a soluble salt for attaining the other terminal color value of the measuring range, after which the difference between the shades of color in the first and second steps is comparatively measured. The indicators, complexing agents, or buffer-complexing agent mixtures preferably may be added as liquids or solids, whereas the buffering suitably is performed by adding a liquid or gaseous buffer. According to preferred embodiments the addition of the liquid test substances is performed through a diaphragm, dropping capillaries, solenoid valves, or measuring pumps, while the addition of the solid test substances suitably is performed by introducing a press-moulded bar consisting of the test substance and a filler into the liquid in such a way that it may be dissolved at a constant rate.

An apparatus for performing the method according to the invention suitably comprises two test chambers which are connected in series in the direction of the flow of the liquid to be tested. A treatment and mixing chamber may be arranged preceding each of the color measuring chambers or the color measuring chambers themselves may contain a mixing device. The color measuring chambers are preferably provided with light transmissive walls. The measuring device itself consists of two photo-sensitive elements, one associated with each color measuring chamber and a common source of light separated from the photo-sensitive elements by their respective color measuring chambers so that light passes through the respective chambers. The photo-sensitive means are connected to a measuring instrument in such a way that the measuring instrument shows the difference in the currents generated in the photo-sensitive element.

The performance of the method will be better understood with apparatus shown by way of example in the drawings:

FIG. 2 shows schematically an intermittently operating apparatus.

Figure 1:
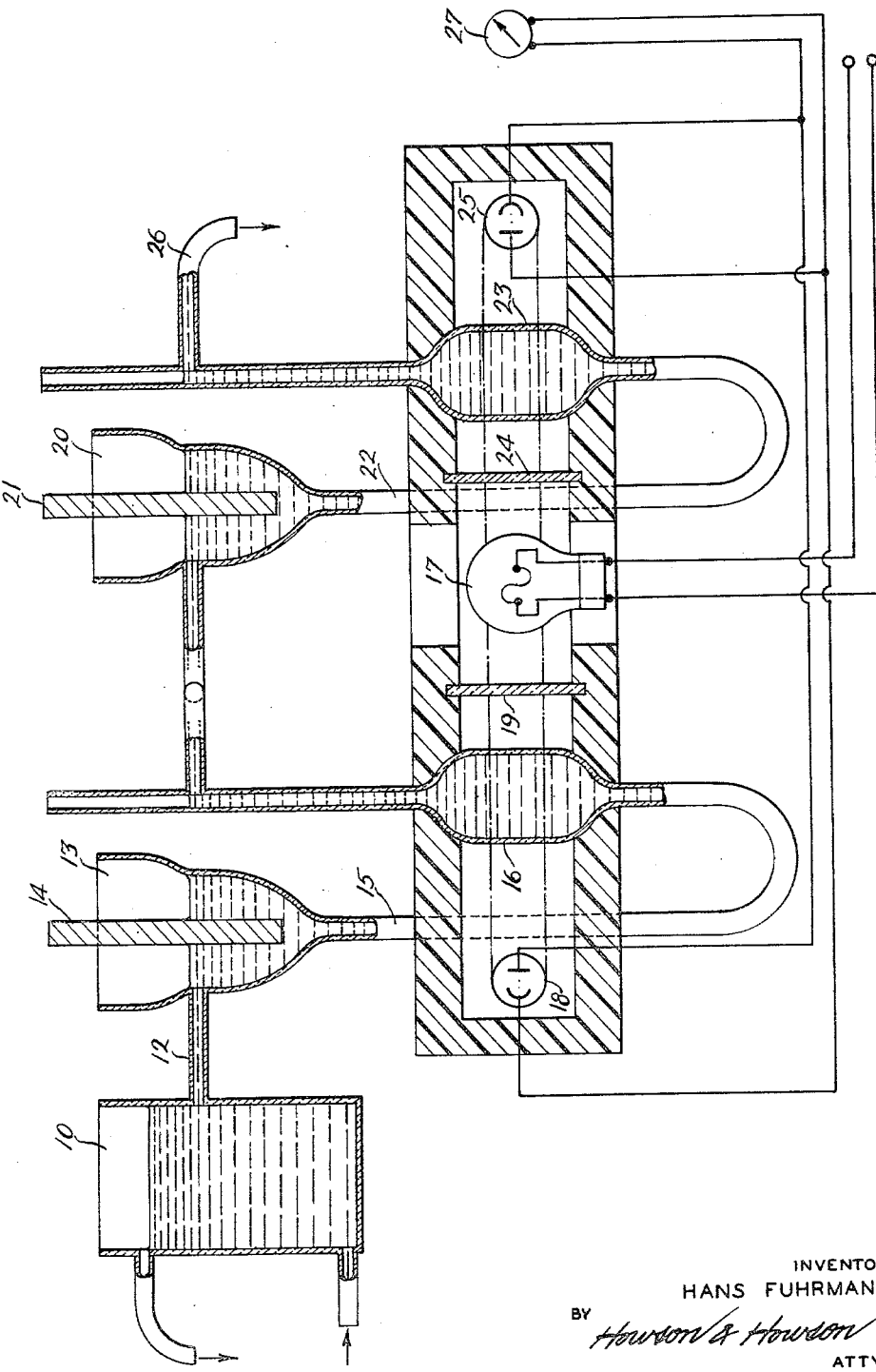
FIG. 1 shows schematically a continuously operating appartus.

The apparatus shown in the drawings is typical of that which may be employed in accordance with the present invention. The following examples of method are typical of those which may be employed with such apparatus and are given in terms of the apparatus illustrated:

*Example 1*

The continuous testing of boiler fed water is performed, for example, in an apparatus shown in FIG. 1 as follows:

In this instance the test is for residual hardness in fluid in the range of from 1 to 10 parts per million of free calcium and magnesium ions. The water to be tested is fed continuously into the tank 10 having an outlet for overflow at a predetermined height in order to maintain a predetermined fluid pressure differential through the system to maintain a rate of flow therethrough found to be optimum. Part of the water in tank 10 flows through a capillary 12 which is selected of a size to ensure a constant rate of flow within the apparatus into the mixing chamber 13 in view of the head provided in tank 10. In the embodiment illustrated the indicator is added from the solid state constituent as a solid bar 14 which dissolves at a predetermined rate so as to provide essentially the same amount of indicator per each unit of volume of flowing water. By proper selection of mixing chamber size, solubility of the solid bar and rate of flow the indicator dissolved will be thoroughly and uniformly mixed with the water as it flows through the mixing chamber. Otherwise a suitable mixing means must be employed for mechanically mixing the constituents. The indicator selected is preferably Chromogenschwarz (Eriochrome Black T, C.I. 203) in which case bar 14 contains as another constituent sufficient buffer for producing and maintaining a pH of 9–10. The bar also preferably contains a complexing agent such as ethylene diamine tetra-acetic acid (the disodium salt of an alkylenediamine tetro-aceticacid). The indicator, buffer and complexing agent may alternatively be added as a liquid, e.g., via dropping capillaries, diaphragms, or other convenient means, either all together or by separate dosing means. Thereafter, the resulting solution flows through a small tube system 15, preferably including a coiled portion, which assumes the mixture of the constituents into a homogenous solution before entering the first color analysis cell 16, which is provided with transparent walls allowing light from lamp 17 to pass through. The color of the solution is determined photometrically by the intensity of the light from lamp 17 after it passes through the color filter 19 and the liquid in cell 16 to the photo-sensitive element 18, which preferably produces a current proportional to some function of light intensity upon it. The resulting color may theoretically be anywhere in the range or on either side of the range from wine red through violet to pale blue. However, presumably in applications where this method is employed, sufficient knowledge of the general range of hardness producing ion content is known so that the complexing agent may be designed to be added at such a rate that under ordinary circumstances the residual hardness will fall within the transistion range or so that if it does not it is over the tolerance permitted.

Next the solution flows to the second mixing chamber 20, in which addition of complexing agent (EDTA) in the form of the solid rod 21 is added at a rate sufficient under all conditions to produce zero hardness. As a result a pure pale blue color is obtained throughout the solution due to thorough mixing in chamber 20 and tube 22. From tube system 22, also preferably including a coiled portion similar to the system 15, the sample of water flows into a second transparent color analysis cell 23. Preferably the same source of light 17, provides a beam through a suitable monochromatic filter 24, through cell 23 to photo-sensitive element 25. From the second cell 23 the solution flows to system overflow 26. A T-shaped fitting 26 at overflow open to the atmosphere serves to maintain the liquid level in the whole system essentially at the level of the overflow. The photo-sensitive elements 18 and 25 are electrically connected in opposition to one another in such a way that the measuring instrument 27 indicates a difference current. The meter may be directly calibrated in terms of hardness in parts per million concentration.

If the conducted measurement were of $CaCO_3$, the indicator color if blue would indicate zero $CaCO_3$. The indicator color if violet would indicate some place in the transition range such as one part per million of $CaCO_3$. The indicator if wine red would indicate at least the terminal amount of the range which might be 10 parts per million of $CaCO_3$. Due to the mode of operating explained above the rather complicated technique of constant dosing of the reagents is no longer necessary. It is desirable that the total volume of the solution to be tested be kept as small as possible to assure adequate mixing and uniformly accurate results.

Instead of chromogenschwarz mentioned above as indicator, other indicators may be used, which may or may not show a change of color from red to blue. The system described is calibrated by using water samples having different known concentrations of hardness causing salts and thereafter calibration remains the same for given additives and rates of addition.

It will be observed that by the method described, no single absolute measurement of color is attempted as in the prior art. Instead measurement is made relative to some fixed reference point (here the terminal color pure pale blue). As a consequence there is no problem relative to differences in coloring due to dye or other constituents since the color of the solution within the transition range is compared with the color of the same solution at a terminal point. In each case the same non-pertinent coloring constituents are present so that their effect is cancelled out and the depth of color due to dye concentration tends to change the register of both color readings essentially the same amount.

It should be noted that were the range of expected hardness of the sample within the transition range, in accordance with the method described above, no complexing agent would need be added in mixing chamber 13 through bar 14 or otherwise. Such a situation constitutes a special case of the method described.

*Example 2*

Another method for analysis of water for residual hardness ions of a concentration of 1–10 parts per million may be performed using the apparatus or system of FIG. 1. As in Example 1 in chamber 13 an indicator (e.g., chromogenschwarz) buffer and complexing agent (EDTA) are added at a fixed rate relative to the rate of flow by a means such as the bar 14. Alternatively, the dosing of these substances may be performed partially or wholly by adding liquid substances by introducing a gaseous buffer, such for example as gaseous ammonia. The amount of complexing agent employed is selected so that the residual hardness components present in the solution will produce a violet color somewhere between pale blue and wine red, wherein the blue color corresponds to water being completely free from hardness and the red color corresponds to water having at least the known hardness of the upper limit of the range. This is measured by photo-sensitive element 18 using light from source 17 passing through cell 16 containing the mixed colored solution.

The solution then flows into mixing chamber 20 in which an excess of calcium or magnesium or a mixture of both is added to it from dissolution of solid bar 21 or otherwise. Thereby the hardness of the solution is increased to a point where a change of color to the wine red terminal color occurs. Now the color shades of the liquid to be tested contained in the color analysis cells 16 and 23, respectively, are measured and compared with one another by means of the two photo-sensitive elements 18 and 25. The difference between the colors is a measure for the hardness of the tested water, with reference to the known end point represented by red color which is just as much a known reference point as the blue color in Example 1. The concentration of the indicator is of no significance and will not affect the measurement, since the method performs a comparative measurement of two parts of one and the same solution. This means that concentration of the indicator in both test chambers is the same so that its extraneous color effect on each is the same. Therefore, only the difference between the shades of color is measured and not the intensity of color.

*Example 3*

The content of silicic acid or phosphate in boiler feed water may be measured in the following manner using the apparatus of FIG. 1. Ammonium molybdate as indicator is added in chamber 13 to the liquid containing the silica ion for the test being made. The pH is also adjusted to approximately 1.7 by addition at this point of sulfuric acid. The color of the resulting solution changes very little, if at all, from the color of the water undergoing test, but whatever the color it is measured in cell 16. As flow proceeds through the mixing chamber 20 a reducing agent such as metol bisulfite is added. After a thorough mixing and time delay of approximately 3 minutes after passing through mixing chamber 20, flow proceeds into the color analysis cell 23 in which a comparison of the color shade of the liquid produced in cell 23 with the uncolored liquid in the cell 13. The amount of the silica ion present is determinative of the depth of the blue color present in cell 23. As in the prior examples the constituents may be added by dissolving solid substances from bars or sticks 14 and 21, respectively.

*Example 4*

The methods described above as being performed in a continuously flowing process may also be performed by an intermittent process. FIG. 2 shows an apparatus for performing similar test methods which are carried out intermittently rather than continuously. For example, the method of the hardness testing of Example 1 may be modified as follows for use with the apparatus of FIG. 2.

The water containing the ion to be tested flows continuously to an overflow tank 31. A duct communicating between the chamber 31 and the mixing chamber 32 is provided with a solenoid valve 33 which may be opened to permit chamber 32 to fill to the level of the overflow of tank 31. The indicator may be added in chamber 32 as a solid from a bar or stick 34 or liquid substance. Solenoid valve 33 will be subjected to a timing device here shown schematically as box 35 to open periodically at intervals of predetermined length to permit a new batch of sample to flow into the mixing chamber 32. The solution is permitted to remain for about a minute in the mixing chamber 32 to dissolve a predetermined amount of the dye indicator, buffer and complexing agent from the solid indicator stick 34. As before, the dye indicator may be Chromogenschwarz, the complexing agent EDTA and the buffer any suitable substance to maintain the pH within the range of 9–10. During this interval the water sample is agitated by stirring means or by a current of air. Thereafter, the solenoid valve 36 in duct 37 opens to allow the solution to flow to the color analysis cell 38. Part of the solution will flow up into the second test chamber 39 by way of connecting tubing 40. The solution leaving chamber 32 has some color preferably in the range from red through violet to blue between these terminal colors depending on the Ca+Mg hardness present. The part of the solution flowing into chamber 39 comes into contact with a stick 41 containing additional complexing agent EDTA sufficient to bring the color in chamber 39 to a terminal pale blue. Chamber 39 serves both as a mixing chamber and as a color analysis cell.

The colorimetrical evaluation is similar to the method described in connection with Example 1. Therefore, again the color shades of the solution having the same color intensity are compared before and after adding the buffer complex ion so that as in Example 1 the color introduced into both cells 38 and 39 due to concentration of the indicator solution is compensated. As before a common light source 42 illuminates the cells 38 and 39 through appropriate monochromatic filters 43 and 44 and cause an output signal by photo-sensitive elements 45 and 46 proportionate to colors in cells 38 and 39. The measuring instrument 47 is switched on by the switch 48 for about 30 to 40 seconds by timer 35, after the chemical reaction in mixing chamber-cell 39 has been completed. Thereafter the solenoid valve 50 in tube 40 at the bottom of the system is opened by timer 35, and the contents of both the chambers 38 and 39 are drained through the outlet.

Since, as stated above, the hardness of different types of water has to be tested cyclically and the absolute values of the waters may differ substantially, it is necessary before each cycle to remove by rinsing the remaining traces of the water sample previously tested. For this reason the apparatus is preferably rinsed between each two measurements. For this purpose, after the test chambers have been drained the mixing chamber 32 is once more shortly filled with the water to be tested, but at once is drained through the valve 19 into both the cell 38 and 39, which likewise have to be rinsed. Because of the short stay of the rinsing water within the mixing chamber 32 and within the test chambers substantially no portion of reagents from sticks 34 and 41 will be dissolved.

The sequence of the various steps of the complete testing cycle is controlled by timer 35 which may include a synchronous motor.

The method according to the invention presents the advantage, that it is no longer necessary to employ the exact dosing of the indicator required in the prior art which necessitated complicated and expensive installations. Measuring errors heretofore introduced by variations in the amount of indicator are avoided since both the measuring steps contain the same amounts of indicator so that influence of the color intensity of the indicator is effectively cancelled in the comparative colorimetric analysis. When carrying out the invention, the concentration of the indicator solution no longer needs to be checked, whereas formely great difficulty was entailed in merely keeping the concentration of the indicator constant. A further important advantage is the possibility of performing the tests in a continuous manner, so that any changes which might arise over a period of time, e.g., in the hardness of the boiler feed water, will be quickly detected.

I claim:

1. A method for determining the amount of an ion present in a liquid which comprises adding in said liquid an indicator solution which provides the liquid with a unique distinctive first color for each ion concentration within a limited range of concentration of said ion and different terminal colors to the liquid at opposite ends of the range, which colors persist regardless of ion concentrations outside the limited range at their respective ends of the range to be quantitatively determined, determining the first color of said liquid, changing the concentration of said ion in said liquid to the extent that said indicator provides a single distinctive color terminal to said range, determining the modified second color of the liquid and determining the difference in the first and second colors of said liquid due to said change in ion content whereby the color differential is representative of a distinctive known concentration of said ion.

2. A method for determining the amount of free calcium and magnesium ions present in a liquid which comprises adding in said liquid an indicator solution which provides the liquid with a unique distinctive first color for each ion in concentration within a limited range of concentration of said ion and different terminal colors to the liquid at opposite ends of the range, which color persists regardless of ion concentrations outside the limited range at their respective ends of the range to be quantitatively determined, determining the first color of said liquid, changing the concentration of said calcium and magnesium ions in said liquid to the extent that said indicator provides a single distinctive color terminal to said range, determining the modified second color of the liquid and determining the difference in said first and second colors of said liquid due to said change in ion content, whereby the color differential is representative of a distinctive known concentration of said ions.

3. The method of claim 2 in which the indicator solution includes Chromogenschwarz which produces a pale blue color characteristic of the essentially complete absence of hardness and with advancing hardness passes from a violet to a wine red color indicative of a predetermined hardness and in which a suitable buffer is provided in sufficient amount to maintain the liquid at a pH of between 9 and 10 which is necessary if the color is to have significance solely with respect to hardness.

4. The method of claim 3 in which the concentration of the ion in the liquid is changed by the addition of more calcium and magnesium ions taking the solution past the terminal wine red color.

5. The method of claim 3 in which after determining the first color a suitable complexing agent is added in order to change the ion concentration in sufficient quantity to combine all the free ions of magnesium and calcium so that the pale blue terminal color is produced.

6. The method for determining the amount of silica acid in boiler feed water by determining the amount of silicate ion present in the boiler water which comprises adding to said boiler water an indicator solution which provides the liquid with a unique distinctive first color for each silicate ion concentration within a limited range of concentration of said ion and different terminal colors to the liquid at opposite ends of the range, which color persists regardless of silicate ion concentration outside of the limited range at the respective ends of the range to be quantitatively determined, determining the first color of said liquid, changing the concentration of said ion in said liquid to the extent that said indicator provides a single distinct terminal color to said range, determining the modified second color of the liquid, and determining the difference in the first and second colors in said liquid due to said change in ion content, whereby the color differential is representative of a distinctive known concentration of said silicate ion.

7. The method of claim 6 in which ammonium molybdate is used as the indicator for the silicate ion and in which a suitable acidic material is added to adjust the pH to approximately 1.7.

8. The method of claim 6 in which after determining the first color a reducing agent is added in order to change the ion concentration and allowed to mix a predetermined amount of time to produce a blue color the depth of which is dependent on the amount of silicate in the liquid.

9. The method of claim 8 in which the reducing agent is metol bisulfite.

10. The method of analyzing the amount of a particular ion in a liquid sample comprising, adding to a liquid sample a measured amount per unit volume of liquid of material including at least a dye and a completing agent suitable for indicating ion content within a given range by unique colors and ion content beyond the range by a different terminal color for each side of the range, mixing the material added well with the sample to form a first mixture, measuring the color of the first mixture, adding to at least part of the first mixture a fixed predetermined additional amount of the same material which changes the ion concentration and thereby affects the color such that the change in color is representative of the unknown amount of constituent present, mixing the additional material well with the first mixture to form a second mixture, measuring the color of the second mixture, and comparing the colors of the first and second mixtures in accordance with predetermined standards.

References Cited by the Examiner

UNITED STATES PATENTS

| 2,019,871 | 11/35 | Pettingill. | |
| 2,362,278 | 11/44 | Jones | 23—253 X |
| 2,408,900 | 10/46 | Alston. | |
| 2,880,070 | 3/59 | Gilbert et al. | 23—230 |
| 2,977,199 | 3/61 | Quittner | 23—230 |
| 2,983,184 | 5/61 | Ferrari. | |
| 3,019,091 | 1/62 | Schneider | 23—253 |
| 3,028,225 | 4/62 | Sheen | 23—253 |

OTHER REFERENCES

Morris, New England Water Works Assn. Jour., vol. 65, 1951, pages 128 to 133.

MORRIS O. WOLK, *Primary Examiner.*

MAURICE A. BRINDISI, *Examiner.*